(12) United States Patent
Farhadi et al.

(10) Patent No.: US 12,647,198 B2
(45) Date of Patent: Jun. 2, 2026

(54) DATA TRANSMISSION AND RECEPTION BASED ON DEVICE PERFORMANCE

(71) Applicant: Telefonaktiebolaget LM Ericsson (publ), Stockholm (SE)

(72) Inventors: Hamed Farhadi, Stockholm (SE); Pål Frenger, Linköping (SE); Niklas Wernersson, Kungsängen (SE); Ulf Gustavsson, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 427 days.

(21) Appl. No.: 18/260,242

(22) PCT Filed: Jan. 4, 2021

(86) PCT No.: PCT/SE2021/050002
§ 371 (c)(1),
(2) Date: Jun. 30, 2023

(87) PCT Pub. No.: WO2022/146206
PCT Pub. Date: Jul. 7, 2022

(65) Prior Publication Data
US 2024/0072925 A1     Feb. 29, 2024

(51) Int. Cl.
*H04L 1/00*          (2006.01)
(52) U.S. Cl.
CPC .......... *H04L 1/0003* (2013.01); *H04L 1/0009* (2013.01); *H04L 1/0015* (2013.01)

(58) Field of Classification Search
CPC ... H04L 1/0003; H04L 1/0009; H04L 1/0015; H04L 1/0016; H04B 1/401
See application file for complete search history.

(56) References Cited

U.S. PATENT DOCUMENTS

| | | | |
|---|---|---|---|
| 10,379,162 B1 * | 8/2019 | Okuyama | ........ G01R 31/31903 |
| 2007/0206695 A1 * | 9/2007 | Ye | ......................... H04L 1/0003 |
| | | | 375/267 |

(Continued)

OTHER PUBLICATIONS

European search report and Search Opinion, EP App. No. 21915952.2, Sep. 10, 2024, 10 pages.

(Continued)

*Primary Examiner* — Steven Hieu D Nguyen
(74) *Attorney, Agent, or Firm* — -Nicholson De Vos Webster & Elliott LLP

(57) ABSTRACT

The present disclosure relates to methods to transmit and/or receive data in a wireless communications network, and a device performing the methods. In an aspect, a method for a device to transmit data in a wireless communications network is provided. The method comprises acquiring a current value of at least one property affecting performance of the data transmission and determining a level of the performance attained with the current value of said at least one property. The method further comprises selecting, based on the determined level of the performance, at least one device configuration of a plurality of different device configurations allowing successful data transmission for the determined level of the performance and performing the data transmission applying the selected at least one device configuration.

14 Claims, 6 Drawing Sheets

(56)         References Cited

U.S. PATENT DOCUMENTS

| | | | |
|---|---|---|---|
| 2008/0102758 A1* | 5/2008 | Camuffo | H03G 3/3042 |
| | | | 455/73 |
| 2009/0195309 A1* | 8/2009 | Yamaoka | H03F 1/3288 |
| | | | 330/149 |
| 2011/0121939 A1* | 5/2011 | Hosomi | H04B 1/036 |
| | | | 340/3.1 |
| 2014/0155007 A1* | 6/2014 | Rofougaran | H04B 1/40 |
| | | | 455/127.1 |
| 2015/0282097 A1 | 10/2015 | Choi et al. | |
| 2016/0095055 A1* | 3/2016 | Sarrigeorgidis | H04B 1/525 |
| | | | 370/311 |
| 2016/0262143 A1* | 9/2016 | Breuer | H04W 52/0258 |
| 2017/0332270 A1* | 11/2017 | Gandhi | H04L 47/38 |
| 2018/0367241 A1 | 12/2018 | Hetrick et al. | |
| 2019/0028230 A1 | 1/2019 | Dabbagh et al. | |
| 2019/0342843 A1 | 11/2019 | Raghavan et al. | |
| 2020/0107228 A1 | 4/2020 | Wang et al. | |
| 2020/0229206 A1* | 7/2020 | Badic | G05D 1/225 |
| 2020/0235971 A1* | 7/2020 | Chakraborty | H04L 1/0005 |
| 2020/0322897 A1 | 10/2020 | Hwang et al. | |
| 2021/0152278 A1* | 5/2021 | Abdel Shahid | H04L 1/0003 |

OTHER PUBLICATIONS

International Preliminary Report on Patentability, PCT App. No. PCT/SE2021/050002, Jul. 13, 2023, 8 pages.

International Search Report and Written Opinion, Application No. PCT/SE2021/050002, Sep. 16, 2021, 11 pages.

Rohde et al., "Discussion on test point selection for EVM in FR2," 2020, 7 pages.

\* cited by examiner

100

101

104
3ʳᵈ UE 103
2ⁿᵈ UE 102
1ˢᵗ UE

S201

Acquiring current
oscillator temperature

S202

Determining
EVM for current
oscillator temperature

S203

Selecting demodulation
scheme allowing
successful reception of
data for the determined
EVM

S204

Performing the data
reception applying the
selected demodulation
scheme

DATA TRANSMISSION AND RECEPTION BASED ON DEVICE PERFORMANCE

CROSS-REFERENCE TO RELATED APPLICATIONS

This application is a National stage of International Application No. PCT/SE2021/050002, filed Jan. 4, 2021, which is hereby incorporated by reference.

TECHNICAL FIELD

The present disclosure relates to methods of a device configured to transmit and/or receive data in a wireless communication network, and a device performing the methods.

BACKGROUND

In a radio communications network, a signal transmitted by a radio base station (RBS) is typically adapted to channel conditions by performing for instance link adaptation and/or performing beamforming when using multi-antenna systems.

Link adaptation is the process of determining the transport block coding and modulation, commonly referred to as modulation and coding scheme (MCS), based on channel quality to reach a certain decoding probability at the receiver. Link adaptation is an important component of both single-user (SU) multiple-input multiple-output (MIMO) and multi-user (MU) MIMO systems.

In these systems, a wireless communication device reports back its present channel quality properties to the RBS which is then applied by the RBS in the transmission when selecting the MCS or performing beamforming.

A problem with any device transmitting and/or receiving radio signals in a wireless communications network is that imperfections in hardware of the device affects performance of the device when transmitting or receiving the radio signals.

SUMMARY

One objective is to solve, or at least mitigate, this problem in the art and to provide improved methods of transmitting and/or receiving data in a device taking into account hardware imperfections of the device and selecting an appropriate device configuration accordingly.

This objective is attained in a first aspect by a method of a device configured to transmit data in a wireless communications network. The method comprises acquiring a current value of at least one property affecting performance of the data transmission and determining a level of the performance attained with the current value of said at least one property. The method further comprises selecting, based on the determined level of the performance, at least one device configuration of a plurality of different device configurations allowing successful data transmission for the determined level of the performance, and performing the data transmission applying the selected at least one device configuration.

This objective is attained in a second aspect by a device configured to transmit data in a wireless communications network, the device comprising a processing unit and a memory, said memory containing instructions executable by said processing unit, whereby the device is operative to acquire a current value of at least one property affecting performance of the data transmission and determine a level of the performance attained with the current value of said at least one property. The device further being operative to select, based on the determined level of the performance, at least one device configuration of a plurality of different device configurations allowing successful data transmission for the determined level of the performance and perform the data transmission applying the selected at least one device configuration.

This objective is attained in a third aspect by a method of a device configured to receive data in a wireless communications network. The method comprises acquiring a current value of at least one property affecting performance of the data reception and determining a level of the performance attained with the current value of said at least one property. The method further comprises selecting, based on the determined level of the performance, at least one device configuration of a plurality of different device configurations allowing successful data reception for the determined level of the performance and performing the data reception applying the selected at least one device configuration.

This objective is attained in a fourth aspect by a device configured to receive data in a wireless communications network, the device comprising a processing unit and a memory, said memory containing instructions executable by said processing unit, whereby the device is operative to acquire a current value of at least one property affecting performance of the data reception and determine a level of the performance attained with the current value of said at least one property. The device is further operative to select, based on the determined level of the performance, at least one device configuration of a plurality of different device configurations allowing successful data reception for the determined level of the performance and perform the data reception applying the selected at least one device configuration.

As mentioned, radio frequency (RF) reception and transmission of data of devices wireless communications network is affected by imperfections in hardware of the device performing the data transmission/reception.

For instance, imperfections in the hardware of a radio base station or wireless communication device in the form of e.g. power amplifier nonlinearities, oscillator phase noise, digital-to-analog converter quantization noise, etc., will negatively affect performance of data transmission and/or reception.

Advantageously, with embodiments described herein, the performance of the device as well as physical properties affecting the performance—for instance temperature—is taken into account upon selecting a device configuration being capable of transmitting data under the given circumstances.

Thus, upon for instance temperature of an amplifier or oscillator in the device changes due to e.g. fluctuating traffic load such that performance of the device transmission is affected, the device will act accordingly and select a configuration in the form of for instance a modulation scheme which complies with the current level of performance of the device. For example, a lower-order modulation scheme may be selected if the device performance currently is lower due to temperature, while a higher-order modulation scheme may be selected if the device performance increases.

In an embodiment, the level of performance is being determined from a look-up table associating levels of performance with values of said of at least one property affecting performance.

In an embodiment, the level of performance is being determined by computing a function indicating the level of the performance as a function of the current value of said at least one property.

In an embodiment, the at least one property affecting performance is selected to be one or more of temperature, transmission power, traffic load, number of wireless communication devices being served in case the device is a radio base station, phase noise, operating point of device components and target link quality.

In an embodiment, the performance is being represented by error vector magnitude (EVM), adjacent channel leakage ratio (ACLR) or intermodulation distortion (IMD).

In an embodiment, the at least one device configuration is selected to be one or more of modulation scheme, coding scheme, threshold of crest-factor reduction (CFR) number of scheduled multiple-input multiple-output (MIMO) layers, beamforming weights, or number of co-scheduled wireless communication devices.

In an embodiment, the method further comprises allowing components having been inactive to warm up to a first temperature where the device applies a lower-order modulation constellation before the components reach a higher second temperature where the device applies a higher-order modulation constellation.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
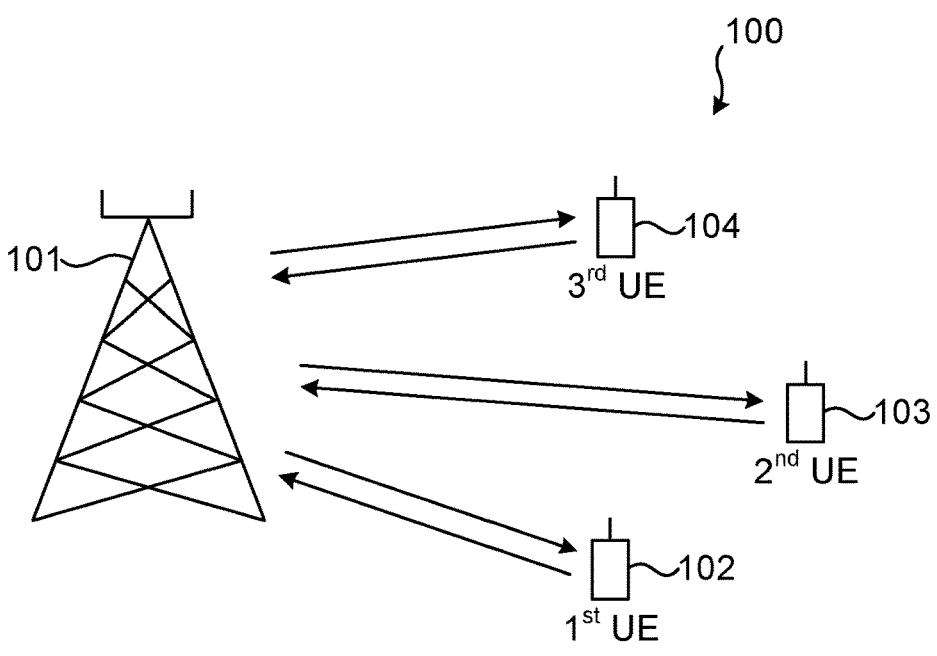
FIG. 1 schematically shows a wireless communications network.

FIG. 1 illustrates a device 101 in a wireless communications network 100 in the form of a radio base station (RBS) in which embodiments may be implemented. The RBS 101 serves a plurality of wireless communication devices 102-104, commonly referred to as user equipment (UE), embodied for instance in the form of smart phones, tablets, gaming consoles, Internet of Things (IoT) devices, etc. Data is transmitted from the RBS 101 to a UE in a downlink (DL) and received at the RBS 101 from a UE in an uplink (UL).

As mentioned, reception and transmission of data in such wireless communications network 100 is affected by imperfections in hardware of any device performing the data transmission/reception.

For instance, imperfections in the hardware of the RBS 101 in the form of e.g. power amplifier nonlinearities, oscillator phase noise, digital-to-analog converter quantization noise, etc., will negatively affect performance of DL data transmission and/or UL data reception.

When using link adaptation and beamforming techniques that do not take into account the impact of radio-frequency (RF) hardware imperfections, the selected transmit parameters (e.g. coding and modulation schemes) may not accurately match the actual link quality and/or the beamforming may be performed based on incorrect assumptions.

Hardware devices in an RF signal path are as such subject to variations due to changes in environmental properties affecting the devices. For instance, the phase noise of an oscillator is highly temperature dependent, and the characteristics of power amplifiers such as gain and drain current are also significantly dependent on temperature. This generally applies to any device transmitting/receiving RF signals, both the RBS 101 and the UEs 102-104.

At the RBS 101, the temperature may vary for different reasons, e.g. due to activating/inactivating sleep mode in MIMO systems, changes in traffic load, and variations in power dissipation. The resulting temperature variations affects the performance of the RF devices which can be expressed in terms of metrics such as e.g. EVM, ACLR or IMD. The quality of a communication link setup by the RBS 101 will typically fluctuate due to these variations, and if not properly compensated for could cause performance degradation.

It is expected that fifth generation (5G) New Radio (NR) base stations will experience greater load dependent temperature variations compared to previous-generation base stations such as e.g. fourth generation (4G) Long Term Evolution (LTE), third generation (3G) Wideband Code Division Multiple Access (WCDMA), second generation (2G) Global System for Mobile Communications (GSM), etc.

A reason for this is that the 5G NR standard is designed with an extensive duration for sleep mode during no or low traffic load (up to 160 ms) to enable energy efficient network operation. While previous-generation standards mandated continuous transmission of reference signals regardless of traffic load, the new 5G NR standard is based on a lean design principle where only as small amount of data as possible is transmitted in the DL when there is no data for transmission. This behavior will result in low energy consumption, but it will also result in much greater component temperature variations in the base station between full traffic load and no traffic load.

Thus, the imperfections of the RBS and UE hardware will negatively affect its performance, and these imperfections are in their turn augmented by physical properties such as temperature.

In an example, the performance of the RBS 101 is represented by a measure referred to as error vector magnitude (EVM). The EVM is a measure of how accurately a radio is transmitting symbols within its constellation indicates a difference of performance of a radio transmitter or receiver as compared to an ideal transmitter or receiver. Hence, the higher the EVM, the worse the performance.

A number of measures of performance may be envisaged, such as e.g. adjacent channel leakage ratio (ACLR) and intermodulation distortion (IMD), where ACLR is the ratio of filtered mean power centered at an assigned channel frequency to the filtered mean power centered on an adjacent channel frequency.

Figure 2:
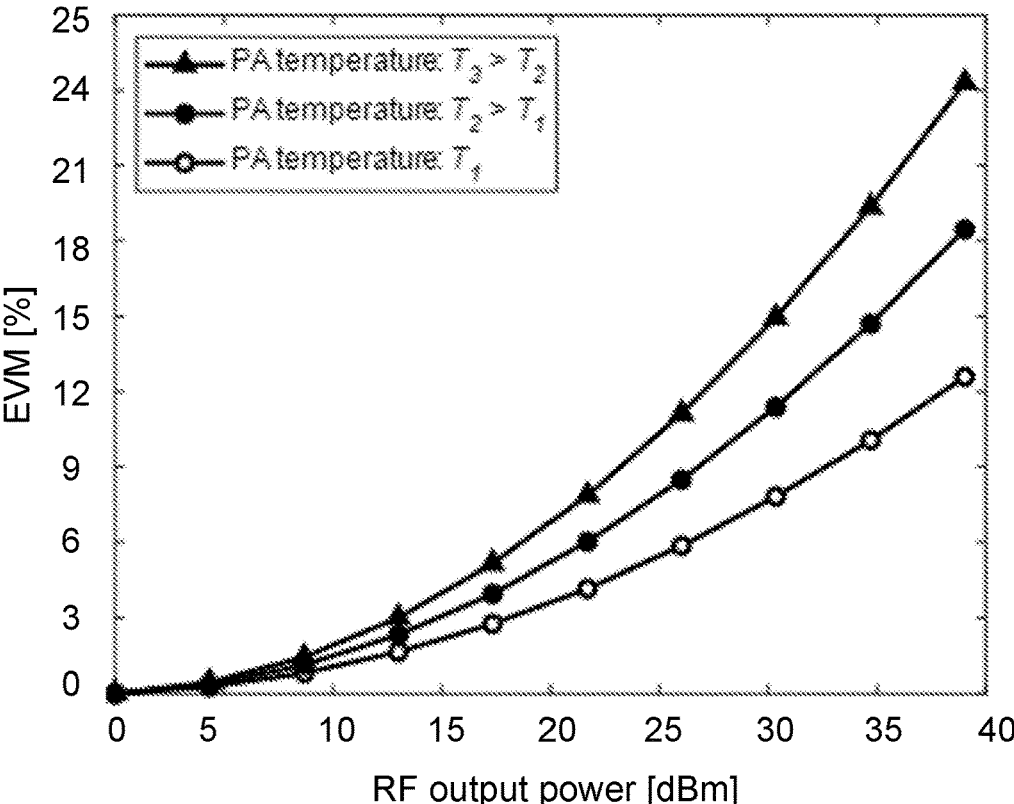
FIG. 2 illustrates how performance of a power amplifier varies with both output power and temperature.

FIG. 2 illustrates in an example how the EVM varies for a power amplifier (PA) of the RBS 101 with both radio frequency (RF) output power of the PA and temperature of the PA. As can be concluded, the EVM increases with increasing output power as well as with increasing temperature.

Now, if the performance of the PA—and thus the RBS 101—decreases to a minimum allowable level due to non-linear characteristic of the PA, it may not be possible for the RBS to successfully perform data transmission.

In an example, for a base station (BS) of type 1-O ("over the air") in 5G wireless communications systems, the EVM of each 5G NR carrier for different modulation schemes applied to data transported on a Physical Downlink Shared Channel (PDSCH) shall be less than the limits given in Table 1 below.

TABLE 1

| Maximum allowable EVM for a respective modulation scheme in BS type 1-O. | |
| --- | --- |
| Modulation scheme | Max. allowable EVM (%) |
| QPSK | 18.5 |
| 16QAM | 13.5 |
| 64QAM | 9 |
| 256QAM | 4.5 |

Thus, if the EVM exceeds 4.5%, 256QAM ("quadrature amplitude modulation") cannot be used, but instead the more error-tolerant 64QAM, 16QAM or QPSK ("quadrature phase-shift keying") modulation scheme must be utilized. In case the EVM exceeds 9%, neither 256QAM nor 64QAM can be used, but 16QAM or QPSK is used instead, and so on.

Turning to FIG. 2, assuming that the output power of the PA is at 20 dBm and the temperature is measured to be $T_3$, the EVM is about 7%, and 256QAM cannot be used since the maximum allowable EVM for 256QAM is 4.5%. Instead, any one of the more error-tolerant 64QAM, 16QAM or QPSK modulation schemes must be selected. In this example, it would be possible to use a higher-order constellation of 64QAM rather than 16AQM, since 64QAM enables transmission of more bits per symbol.

Figure 3A:
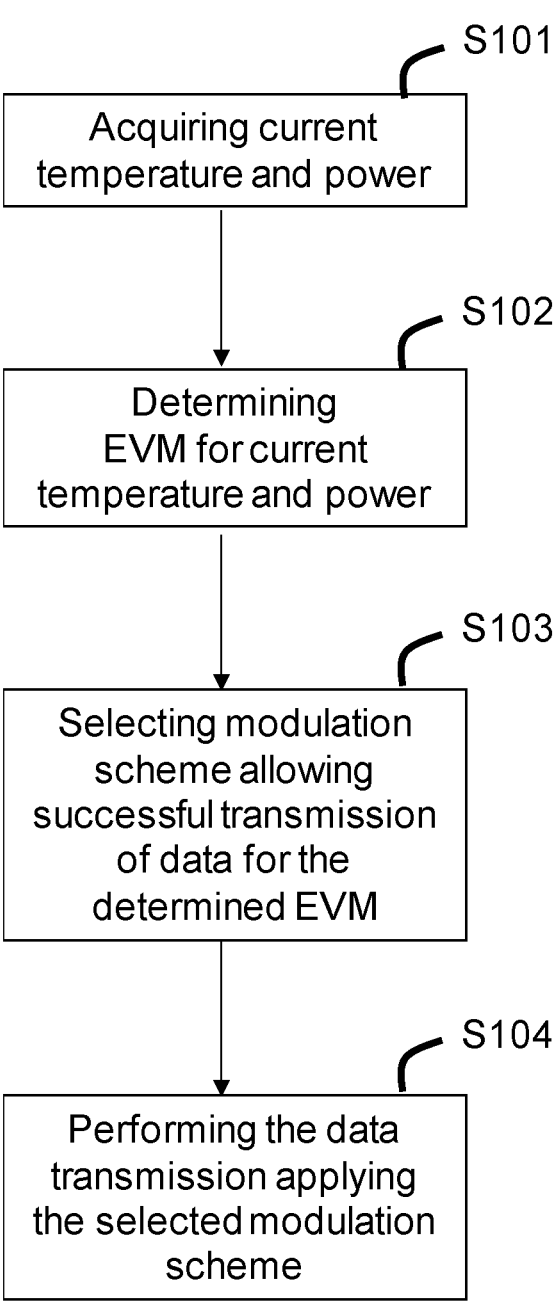
FIG. 3a illustrates a flowchart of a method of controlling data transmission of a device in wireless communications network according to an embodiment.

FIG. 3*a* illustrates a flowchart of a method of controlling data transmission of a device in wireless communications network according to an embodiment, the device being embodied by the RBS 101.

In a first step S101, the RBS 101 acquires a current value of at least one property affecting performance of the data transmission. In this exemplifying embodiment, the RBS 101 acquires the current values of two properties affecting the performance, namely temperature T and output power P of the PA. The RBS 101 may measure the temperature using a temperature sensor, and typically is aware of the power setting of the PA.

In line with the above example, $T=T_3$ and P=20 dBm.

In step S102, the RBS determines a level of the performance attained with the current value of each of the two properties T and P. In an exemplifying embodiment, the RBS 101 may store a look-up table reflecting the data shown in FIG. 2, and thus concludes that EVM=5% given the current values of T and P.

It is noted that in this particular exemplifying embodiment, values of two properties affecting the RBS performance is acquired, i.e. temperature and output power of the PA. However, in a more linear device other than a PA, the performance may to a major part be affected by a sole property such as temperature (or power, or other properties). In such a scenario, the RBS 101 may determine the current level of performance based on that sole property. Alternatively, in another device even more properties may be taken into account.

With reference to Table 1, the RBS 101 selects in step S103, based on the determined level of the performance, i.e. EVM=7%, at least one device configuration of the three different device configurations allowing successful data transmission for the current level of the performance.

In other words, given that EVM=7%, three device configurations—in this example embodied in the form of RBS modulation schemes—would still allow successful data transmission: 64QAM, 16QAM and QPSK. In this example, the RBS 101 selects the highest-order constellation of 64QAM.

Finally, in step S104, the RBS 101 performs the data transmission applying the selected modulation scheme, i.e. 64QAM, for the data being transmitted.

Advantageously, the performance of the RBS 101—as well as physical properties affecting the performance—is taken into account upon selecting an RBS configuration being capable of transmitting data under the given circumstances.

Thus, upon for instance temperature of a PA or a radio unit changes due to e.g. fluctuating traffic load such that performance of the RBS transmission is affected, the RBS 101 will act accordingly and select a configuration in the form of for instance a modulation scheme which complies with the current level of performance of the RBS 101.

This is particularly advantageous when adapting to the extensive duration of sleep mode transmission in 5G, which is likely to cause fluctuations in temperature.

Moreover, hardware imperfections are more pronounced for high frequency components, making the embodiments particularly suitable for 5G bands (e.g. up to 52 GHz) and for 6G bands (up to 1 THz).

Further advantageous is that more inexpensive hardware lacking temperature stabilizers can be used, since the RBS 101 may take into account changes in temperature.

It is noted that the same approach can be used for data received in the UL. For instance, the temperature of a demodulator of the RBS 101 may affect its ability of demodulate the received UL data and thus the performance of the RBS 101. In line with the above exemplifying embodiment, the RBS 101 may thus select an appropriate demodulation scheme to be applied for the received UL data, thereby allowing successful data reception for further upstream transport to a core network.

Figure 3B:
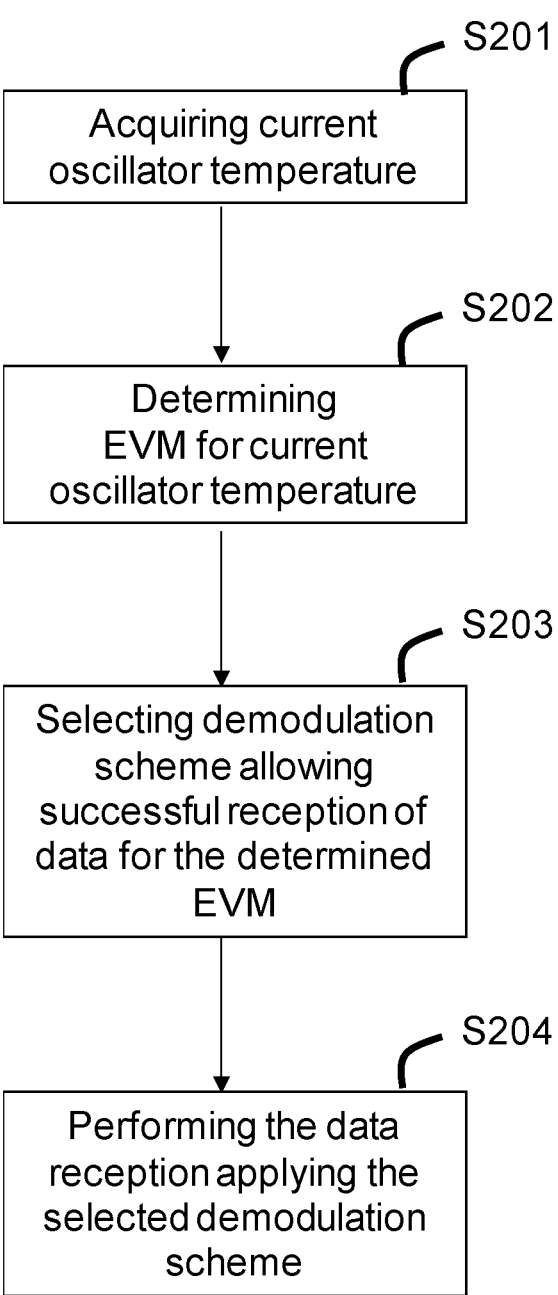
FIG. 3b illustrates a flowchart of a method of controlling data reception of a device in wireless communications network according to an embodiment.

FIG. 3b illustrates a flowchart of a method of controlling data reception of a device in wireless communications network according to an embodiment, the device being embodied by the RBS 101.

In a first step S201, the RBS 101 acquires a current value of at least one property affecting performance of the data reception. In this exemplifying embodiment, the RBS 101 acquires the current value of temperature of an oscillator used for demodulating received signals. The RBS 101 may measure the temperature using a temperature sensor.

In step S202, the RBS 101 determines a level of the performance attained with the current value of the demodulation oscillator temperature, for instance embodied in the form of EVM.

The RBS 101 selects in step S203, based on the determined EVM, a particular demodulation scheme allowing successful data reception for the current level of the performance.

Finally, in step S204, the RBS 101 performs the data reception applying the selected demodulation scheme for the data being received.

In an embodiment, properties that affect the performance of RF hardware of the RBS 101, and which thus are taken into account, include (estimated or measured) temperature T and transmit power P and one or more of further properties Z potentially affecting RBS performance, such as for instance operating point of RBS components, target link quality, traffic load, number of UEs served by the RBS 101, etc.

Rather than using a look-up table for determining which level of performance (in the form of e.g. EVM) is attained at a given temperature T and power P (and possibly further properties Z), the RBS 101 computes a function resulting in a current EVM:

$$EVM = f(T, P, Z)$$

With reference again to FIG. 2, the RBS 101 may compute a function indicating EVM representing each of the three curves as a function of T and P (and possibly Z) according to the above given example function. Advantageously, by computing one or more functions to attain RBS performance, it is possible to provide a fine granularity for the computed performance with respect to changes in the properties affecting the performance of the RBS 101.

The function f(T, P, Z) can be learned by the RBS 101 by utilizing machine learning (ML), for example by performing regression on collected EVM measurements at different temperatures, transmit powers, and other parameters that impact the EVM.

In one embodiment, component or devices that have been inactive and hence having a low component temperature are allowed to after a short warm up phase start using e.g. a lower-order modulation constellation such as QPSK when the temperature reaches a first values. The system may then gradually start to use a higher-order modulation constellation such as e.g. 16QAM when the component temperature gradually increases and reaches a second value.

Many components are preferably operated in a given temperature range. For instance, an oscillator would optimally warm up to a certain nominal operating temperature where the frequency of the oscillator stabilizes at a value or range for which the system is designed. Deviations from the nominal operating point may lead to degraded performance.

In the above described embodiments, the type of configuration selected by the RBS 101 is embodied in the form of modulation scheme to be applied to the transmitted data.

Alternative device configurations to be selected based on a determined current performance level include weights applied when performing beamforming. For instance, in case of lower temperatures it may be beneficial to perform so-called maximum ratio combining (MRC) adding together signals from each channel or antenna branch, while for higher temperatures it may be beneficial to instead perform minimum-mean-squared-error (MMSE) precoding.

In another example, in case of lower temperatures it may be beneficial to rely only on SU-MIMO whereas for higher temperatures MU-MIMO is selected.

As has been described hereinabove, the temperature for instance the PA or other RBS devices may be measured. However, if more detailed temperature values are to be acquired, for instance for individual components in the PA, other approaches may be used to estimate these temperatures based on other properties.

In an embodiment, the temperature of a device/component is estimated from the traffic load of the RBS 101, for instance from a look-up table listing the estimated temperature for each traffic load, or by computing the temperature as a function of traffic load.

In another embodiment, the temperature is estimated based on dissipated power of the RBS 101. The temperature of a device/component is estimated from the dissipated power of the RBS 101, for instance from a look-up table listing the estimated temperature for each dissipated power, or by computing the temperature as a function of dissipated power.

In still another embodiment, the temperature is estimated based on mode of transmission of the RBS 101, for instance whether MIMO sleep mode is activated or not or depending on the number of layers that are scheduled for transmission. The temperature of a device/component is estimated based on the current transmission mode, for instance from a look-up table listing the estimated temperature for each transmission mode, or by computing the temperature as a function of the transmission mode.

Figure 4:
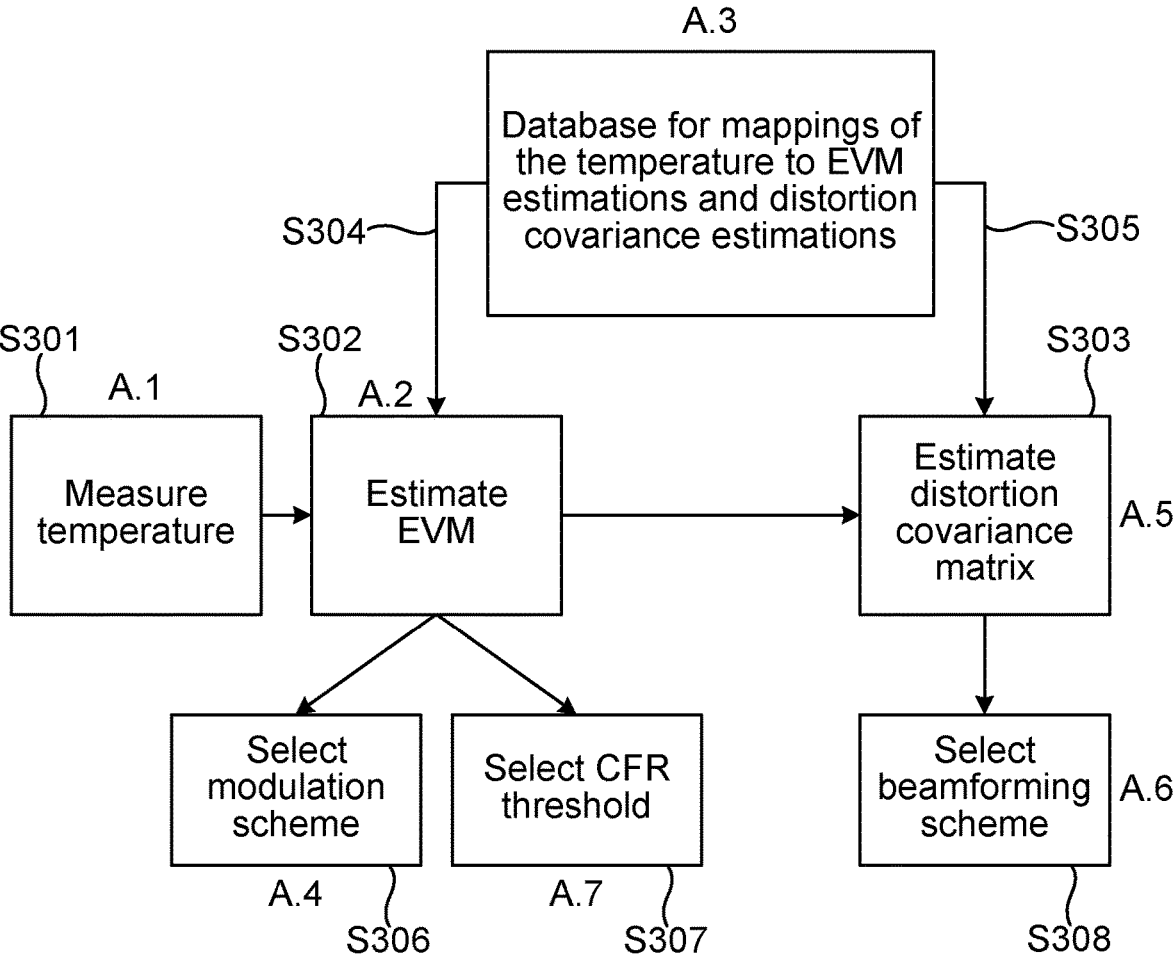
FIG. 4 illustrates link adaption performed by a radio base station by taking temperature into account in an embodiment.

FIG. 4 illustrates link adaption performed by the RBS 101 by taking temperature into account in an embodiment, where a number of different entities in the RBS 101 each provides functionality as will be described in the following.

In step S301, entity A.1 estimates temperature T of the RBS 101. As is understood, this may be the temperature of the RBS transmitter and/or at individual RBS transmitter components.

In step S302, entity A.2 determines the current EVM based on the temperature T estimated by entity A.1, and further on an acquired current transmit power P and other properties Z, such as for instance current traffic load.

As previously described, the EVM may be determined using a look-up table or by computing a function:

$$EVM(t) = f(T(t), P(t), Z(t))$$

Alternatively, since the intrinsic temperature of the PA (i.e. the temperature of a transistor-die inside a PA package) may differ from the observed or measured temperature T(t), and change over time and power with a different time-constant, estimating an instantaneous or short-term EVM using average power may provide a more accurate EVM estimate. The function used could then be:

$$EVM(t) = f\left(T(t), \int_{t-\epsilon}^{t} P(t)dt, Z(t)\right)$$

In step S303, entity A.5 computes a distortion covariance matrix based on the estimated current temperature provided by entity A.2.

In step S304, entity A.3 provides entity A.2 with model parameters that can be used to compute EVM as a function of temperature and further entity A.3 provides entity A.5 with model parameters that can be used to compute the distortion covariance matrix as a function of temperature.

Entity A.3 contains pre-trained models that represent dependencies of EVM and distortion covariance matrix to properties such as temperature. For example, if a polynomial model is used to compute an EVM estimate as a function of temperature, then the order of the polynomial and the polynomial coefficients will be provided to A.2 in step S304.

Thus, entity A.2 acquires the temperature from entity A.1 and model parameters from entity A.3 in step S304 and computes an estimation of the EVM in step S302.

Entity A.5 acquires the temperature value from entity A.1 (possibly via entity A.2) and the EVM estimate from entity A.2, and receive model parameters from entity A.3 in step S305 and computes an estimation of the distortion covariance matrix in step S303.

Finally, in step S306 entity A.4 selects an appropriate modulation scheme based on the estimated current EVM, while entity A.7 selects a so-called crest factor reduction (CFR) threshold based on the estimated current EVM in step S307, and entity A.6 selects in step S3o8 an appropriate beamforming scheme based on the computed distortion covariance matrix. The selected configurations are than applied by the RBS 101 upon transmitting data.

Figure 5:
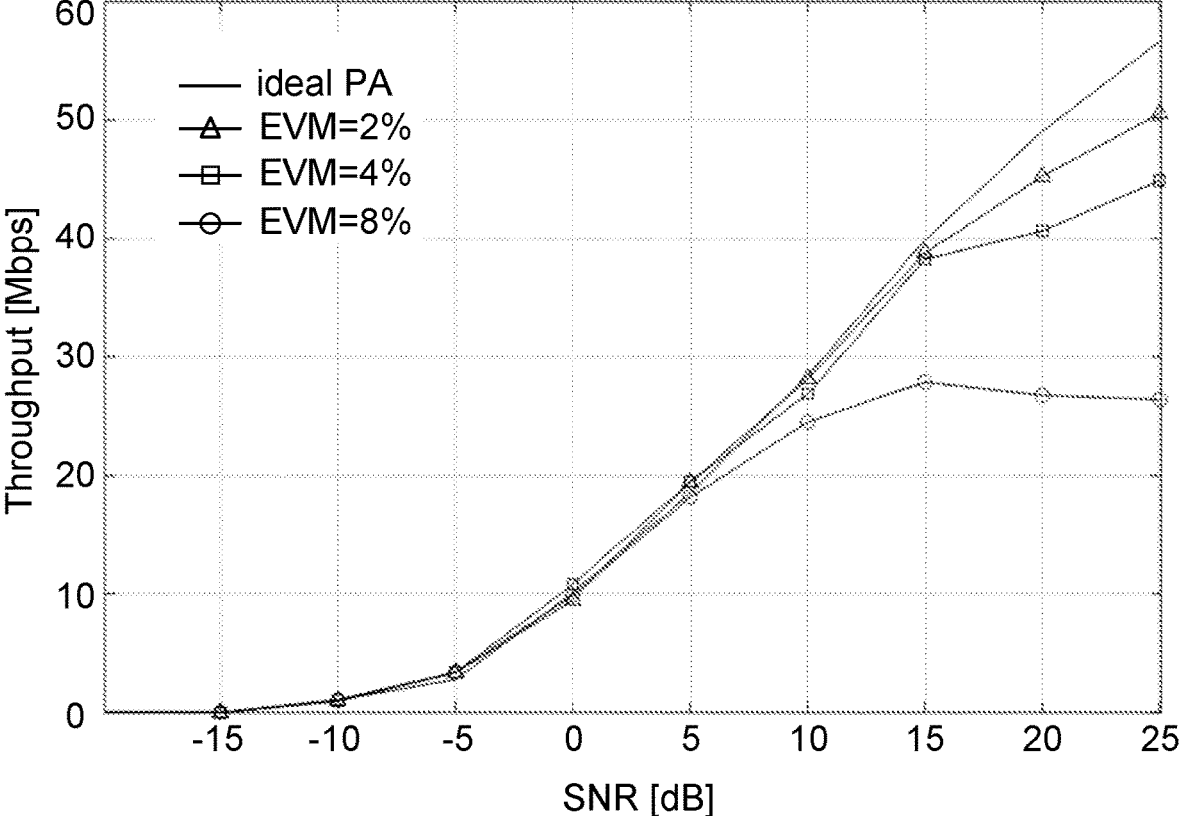
FIG. 5 illustrates data throughput as a function of signal-to-noise ratio of signals transmitted by a radio base station using four antennas for different levels of power amplifier nonlinearities.

FIG. 5 illustrates RBS data throughput as a function of signal-to-noise ratio (SNR) of signals transmitted by the RBS 101 using four antennas for different levels of PA nonlinearities, in this case embodied by EVM. As can be seen, for an ideal PA, the throughput increases steadily with increasing SNR, while for increasing levels of EVM (2%, 4%, and 6% respectively in FIG. 5) the throughput versus SNR performance degrades compared to the ideal case, and eventually flattens out. Thus, selecting an appropriate RBS configuration based on the current performance of the RBS 101 is highly advantageous.

Figure 6:
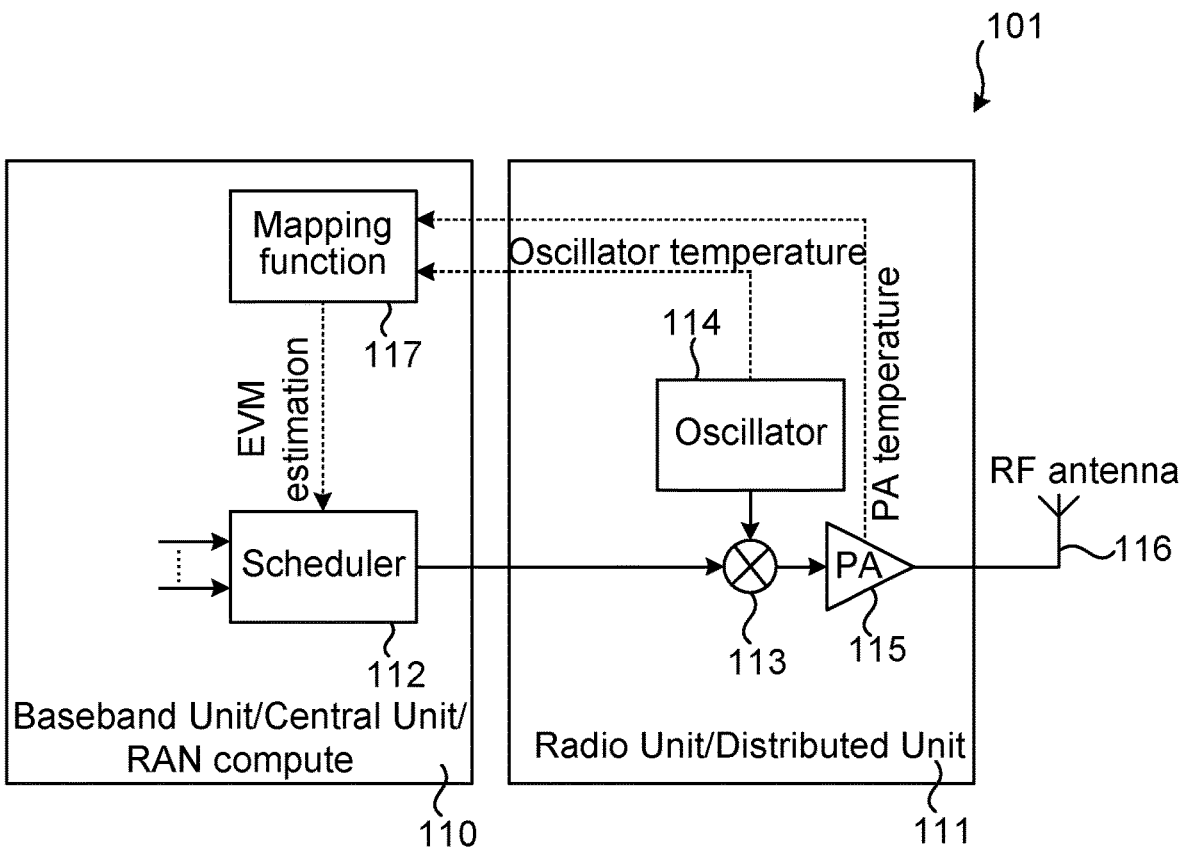
FIG. 6 illustrates a schematic view of a radio base station according to an embodiment.

FIG. 6 illustrates a schematic view of the RBS 101 comprising a radio baseband unit 110 (or central unit, radio access network (RAN) compute unit, etc.) and a radio unit 111 (or distributed unit, etc) according to an embodiment.

The baseband unit 110 comprises a scheduler 112 configured to schedule transmission of data of the RBS 101, the scheduled data is transported to the radio unit in for modulation in modulator 113 at a frequency provided by oscillator 114.

The modulated data is then amplified by power amplifier (PA) 115 before being transmitted in the DL over RF antenna 116.

Now, in an embodiment properties affecting the performance of the RBS 101, in this example oscillator temperature and PA temperature, is sent to mapping function 117 (which could by implemented in the scheduler 112 but is shown as a separate entity for illustrative purposes).

The mapping function 117 determines a level of performance—in this case EVM—of the RBS 101 for the current values of oscillator and PA temperature using a look-up table or by computing an appropriate function.

In this example, the mapping function determines that EVM=14%. In line with the example previously given in Table 1, the scheduler 112 will then conclude that the only modulation scheme which can be used while still allowing successful transmission of data is QPSK, which selection is communicated to the modulator 113 (and possibly the mapping function 117) such that the scheduled data is modulated using QPSK before being transmitted in the DL over the RF antenna 116.

Figure 7:
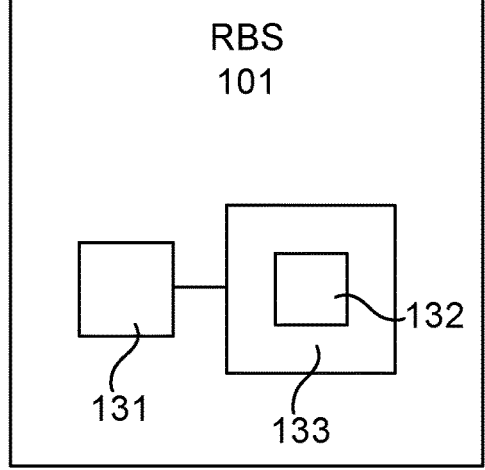
FIG. 7 illustrates a radio base station configured to transmit and receive data in a wireless communications network according to an embodiment.

FIG. 7 illustrates a device configured to transmit and receive data in a wireless communications network according to an embodiment. The device may be embodied for instance by the RBS 101 or any one of the UEs 102-104, even though in this particular exemplifying embodiment, the device is illustrated to be an RBS 101.

The steps of the method performed by the scheduler of the RBS 101 are in practice performed by a processing unit 121 embodied in the form of one or more microprocessors arranged to execute a computer program 122 downloaded to a suitable storage volatile medium 123 associated with the microprocessor, such as a Random Access Memory (RAM), or a non-volatile storage medium such as a Flash memory or a hard disk drive. The processing unit 121 is arranged to cause the RBS 101 to carry out the method according to embodiments when the appropriate computer program 122 comprising computer-executable instructions is downloaded to the storage medium 123 and executed by the processing unit 121. The storage medium 123 may also be a computer program product comprising the computer program 122. Alternatively, the computer program 122 may be transferred to the storage medium 123 by means of a suitable computer program product, such as a Digital Versatile Disc (DVD) or a memory stick. As a further alternative, the computer program 122 may be downloaded to the storage medium 123 over a network. The processing unit 121 may alternatively be embodied in the form of a digital signal processor (DSP), an application specific integrated circuit (ASIC), a field-programmable gate array (FPGA), a complex programmable logic device (CPLD), etc.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for a device to transmit data in a wireless communications network, comprising:

acquiring a current value of temperature and output power at a power amplifier of the device;

determining a level of performance for a modulation or coding scheme attainable for transmission with the current value of the temperature and the output power;

selecting, based on the determined level of performance, a modulation or coding scheme allowing successful data transmission from the device; and performing data transmission applying the selected modulation or coding scheme.

2. The method of claim 1, wherein the level of performance being determined from a look-up table associating levels of performance with the temperature and the output power.

3. The method of claim 1, wherein the level of performance being determined by computing a function indicating the level of the performance as a function of the current value of the temperature and the output power.

4. The method of claim 1, wherein the device is a radio base station.

5. The method of claim 1, wherein the level of performance is error vector magnitude (EVM), adjacent channel leakage ratio (ACLR), or intermodulation distortion (IMD).

6. The method of claim 1, further comprising:

allowing components of the power amplifier having been inactive to warm up to a first temperature where the device applies a lower-order modulation constellation before the components reach a higher temperature where the device applies a higher-order modulation constellation.

7. A method for a device to receive data in a wireless communications network, comprising:

acquiring a current value of temperature for an oscillator of a radio frequency hardware of the device;

determining a level of error vector magnitude (EVM) with the current value of temperature;

selecting, based on the determined level of EVM, a demodulation scheme allowing successful data reception for the device; and performing data reception applying the selected demodulation scheme.

8. A device to transmit data in a wireless communications network, the device comprising:

a processing unit; and a memory, said memory containing instructions which, when executed by said processing unit, cause the device to:

acquire a current value of temperature and output power at a power amplifier of the device;

determine a level of performance for a modulation or coding scheme attainable for transmission with the current value of the temperature and the output power;

select, based on the determined level of performance, a modulation or coding scheme allowing successful data transmission from the device; and perform data transmission applying the selected modulation or coding scheme.

9. The device of claim 8, further to determine the level of performance from a look-up table associating levels of performance with the temperature and the output power.

10. The device of claim 8, further to determine the level of performance by computing a function indicating the level of the performance as a function of the current value of the temperature and the output power.

11. The device of claim 8, wherein the device is a radio base station.

12. The device of claim 8, wherein the level of performance is error vector magnitude (EVM), adjacent channel leakage ratio (ACLR), or intermodulation distortion (IMD).

13. The device of claim 8, further to:

allow components of the power amplifier having been inactive to warm up to a first temperature where the device applies a lower-order modulation constellation before the components reach a higher temperature where the device applies a higher-order modulation constellation.

14. A device to receive data in a wireless communications network, the device comprising:

a processing unit; and a memory, said memory containing instructions which, when executed by said processing unit, cause the device to:

acquire a current value of temperature for an oscillator of a radio frequency hardware of the device;

determine a level of error vector magnitude (EVM) with the current value of the temperature;

select, based on the determined level of EVM, a demodulation scheme allowing successful data reception for the device; and perform data reception applying the selected demodulation scheme.

* * * * *